(12) United States Patent
Lee et al.

(10) Patent No.: US 7,839,478 B2
(45) Date of Patent: Nov. 23, 2010

(54) TEMPERATURE SENSOR FOR DISPLAY DEVICE, THIN FILM TRANSISTOR ARRAY PANEL INCLUDING THE TEMPERATURE SENSOR, LIQUID CRYSTAL DISPLAY, DRIVING CIRCUIT FOR LIQUID CRYSTAL DISPLAY AND FLICKER CONTROLLING SYSTEM FOR LIQUID CRYSTAL DISPLAY

(75) Inventors: Ki-Chan Lee, Cheonan-si (KR); Yun Jae Park, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1166 days.

(21) Appl. No.: 11/486,744

(22) Filed: Jul. 14, 2006

(65) Prior Publication Data

US 2007/0012897 A1 Jan. 18, 2007

(30) Foreign Application Priority Data

Jul. 15, 2005 (KR) .............. 10-2005-0064147
Jan. 10, 2006 (KR) .............. 10-2006-0002586

(51) Int. Cl.
*G02F 1/1345* (2006.01)
*G09G 3/36* (2006.01)

(52) U.S. Cl. ............... 349/149; 349/151; 349/152; 345/90

(58) Field of Classification Search .......... 349/149, 349/151, 152; 345/90
See application file for complete search history.

(56) References Cited

U.S. PATENT DOCUMENTS

| | | | |
|---|---|---|---|
| 5,818,010 A * | 10/1998 | McCann | 219/210 |
| 5,926,162 A | 7/1999 | Wood | |
| 6,590,555 B2 * | 7/2003 | Su et al. | 345/92 |
| 6,891,135 B2 | 5/2005 | Pala | |
| 7,071,929 B2 | 7/2006 | Fujii | |
| 2002/0050971 A1 * | 5/2002 | Su et al. | 345/92 |
| 2005/0073642 A1 | 4/2005 | Dunn | |
| 2005/0200588 A1 | 9/2005 | Kaneda | |
| 2008/0246903 A1 * | 10/2008 | Park et al. | 349/72 |

FOREIGN PATENT DOCUMENTS

| | | |
|---|---|---|
| CN | 88102279 A | 11/1988 |
| CN | 1296167 A | 5/2001 |
| CN | 1519955 | 8/2004 |
| CN | 200410039503 | 8/2004 |
| JP | 05-127146 | 5/1993 |
| JP | 05-307169 | 11/1993 |
| JP | 06-175108 | 6/1994 |
| JP | 08-043798 | 2/1996 |
| JP | 11-024045 | 1/1999 |
| JP | 2000-009547 | 1/2000 |
| JP | 2001-337650 | 12/2001 |
| JP | 2002-098940 | 4/2002 |
| JP | 2002-182624 | 6/2002 |
| JP | 2004-252231 | 9/2004 |

(Continued)

*Primary Examiner*—Mike Qi
(74) *Attorney, Agent, or Firm*—Innovation Counsel LLP

(57) ABSTRACT

A temperature sensor for a display device is provided, which includes a substrate for the display devices, and a temperature sensing line formed on the substrate. The temperature sensing line is a conductor.

13 Claims, 13 Drawing Sheets

FOREIGN PATENT DOCUMENTS

| | | |
|---|---|---|
| KR | 10-0121151 | 8/1997 |
| KR | 1997-0071061 | 11/1997 |
| KR | 1998-048655 | 9/1998 |
| KR | 10-0386733 | 5/2003 |
| KR | 1020030088575 | 11/2003 |
| KR | 1020040072420 | 8/2004 |
| KR | 1020050031675 | 4/2005 |
| KR | 1020050036341 | 4/2005 |
| KR | 1020050066711 | 6/2005 |
| KR | 1020050086314 | 8/2005 |

* cited by examiner

TEMPERATURE SENSOR FOR DISPLAY DEVICE, THIN FILM TRANSISTOR ARRAY PANEL INCLUDING THE TEMPERATURE SENSOR, LIQUID CRYSTAL DISPLAY, DRIVING CIRCUIT FOR LIQUID CRYSTAL DISPLAY AND FLICKER CONTROLLING SYSTEM FOR LIQUID CRYSTAL DISPLAY

RELATED APPLICATION

The present application claims priority from Korean Patent Application Nos. 2005-0064147 filed on Jul. 15, 2005 and 2006-0002586 filed on Jan. 10, 2006, the disclosures of which are hereby incorporated herein by reference in their entirety.

BACKGROUND OF THE INVENTION (a) Field of the Invention

The present invention relates to a temperature sensor for a display device, a thin film transistor array panel including the temperature sensor, and a liquid crystal display.

(b) Description of Related Art

Display devices used for monitors of computers and television sets generally include self-emitting display devices and non-emitting display devices. Self-emitting display devices include organic light emitting displays (OLEDs), vacuum fluorescent displays (VFDs), field emission displays (FEDs), and plasma panel displays (PDPs), and non-emitting display devices include liquid crystal displays (LCDs). Unlike self-emitting display devices, non-emitting display devices require a light source to display images.

An LCD includes two panels provided with field-generating electrodes that have a liquid crystal (LC) layer having dielectric anisotropy interposed between them. The field-generating electrodes are supplied with electric voltages to generate an electric field across the LC layer. Light transmittance through the liquid crystal layer varies depending on the strength of the generated electric field, which can be controlled by the applied voltages. Accordingly, desired images are displayed by adjusting the applied voltages.

The light source for an LCD may be lamps that are coupled to the LCD, or it may be an ambient light source such as the sun.

Since optical characteristics of the liquid crystal of the LC layer change based on temperature, the temperature variation of the LCD affects the reliability of the LCD. For example, optical characteristics such as refractive index, dielectric constant, coefficient of elasticity, and viscosity of the liquid crystal are inversely proportional to the thermal energy of liquid crystal molecules, and their values decrease as the temperature of the liquid crystal rises.

Operational characteristics of elements that are mounted on or integrated with the LCD also change with temperature.

A temperature sensor is disposed on a printed circuit board (PCB) mounted with a plurality of driving circuits to detect the temperature of the LCD. However, the PCB is generally disposed on the rear side of the LCD on which the lamps and any other heat-generating elements are disposed. The temperature sensor is not disposed on the front side of the LCD where the LC layer is formed. Thus, the temperature sensor detects the temperature at the rear of the LCD where temperature swings are large. The temperature that is detected by the temperature sensor may be significantly different from the temperature of the LC layer, and temperature compensation of the LCD based on the temperature at the rear of the LC layer is not precise.

Another disadvantage with the above-described configuration is that the temperature sensor is separately installed on the PCB. This separate installation increases design redundancy of the LCD, increasing manufacturing cost.

SUMMARY OF THE INVENTION

A motivation of the present invention is to solve the problems of conventional techniques.

In one aspect, the invention is a temperature sensor for a display device that has a substrate. The sensor includes a temperature sensing line formed on the substrate, wherein the temperature sensing line is an electrical conductor.

In another aspect, the invention is a thin film transistor array panel that includes a substrate and a thin film transistor and a temperature sensing line that are formed on the substrate. The thin film transistor has a gate electrode, a source electrode, and a drain electrode. The temperature sensing line is formed on the same layer as either the gate electrode or the source and drain electrodes.

In yet another aspect, the invention is a liquid crystal display that includes a pixel, a first signal line connected to the pixel, and a second signal line connected to the pixel and intersecting the first signal line. The liquid crystal display also includes a temperature sensing line separate from the first and second signal lines, wherein the temperature sensing line is formed on the same layer as the first or second signal line.

In yet another aspect, the invention is a driving circuit for a liquid crystal display having a liquid crystal panel assembly. The driving circuit includes a digital variable resistor (DVR) generating a first voltage, a temperature sensing unit connected to the DVR and generating a second voltage, and a common voltage generator connected to the temperature sensing unit and generating a common voltage on the basis of the second voltage and a third voltage that is received from the liquid crystal panel assembly.

In yet another aspect, the invention is a flicker controlling system. The flicker controlling system includes a liquid crystal display provided with a liquid crystal panel assembly, a photographing device for photographing the liquid crystal display, and an electronic device coupled with the liquid crystal display and the photographing device. The liquid crystal display includes a DVR generating a first voltage, a temperature sensing unit connected to the DVR and generating a second voltage, and a common voltage generator connected to the temperature sensing unit and generating a common voltage on the basis of the second voltage and a third voltage that is received from the liquid crystal panel assembly.

BRIEF DESCRIPTION OF THE DRAWINGS

The present invention will become more apparent by describing preferred embodiments thereof in detail with reference to the accompanying drawings, in which.

DETAILED DESCRIPTION OF THE EMBODIMENTS

Figure 1:
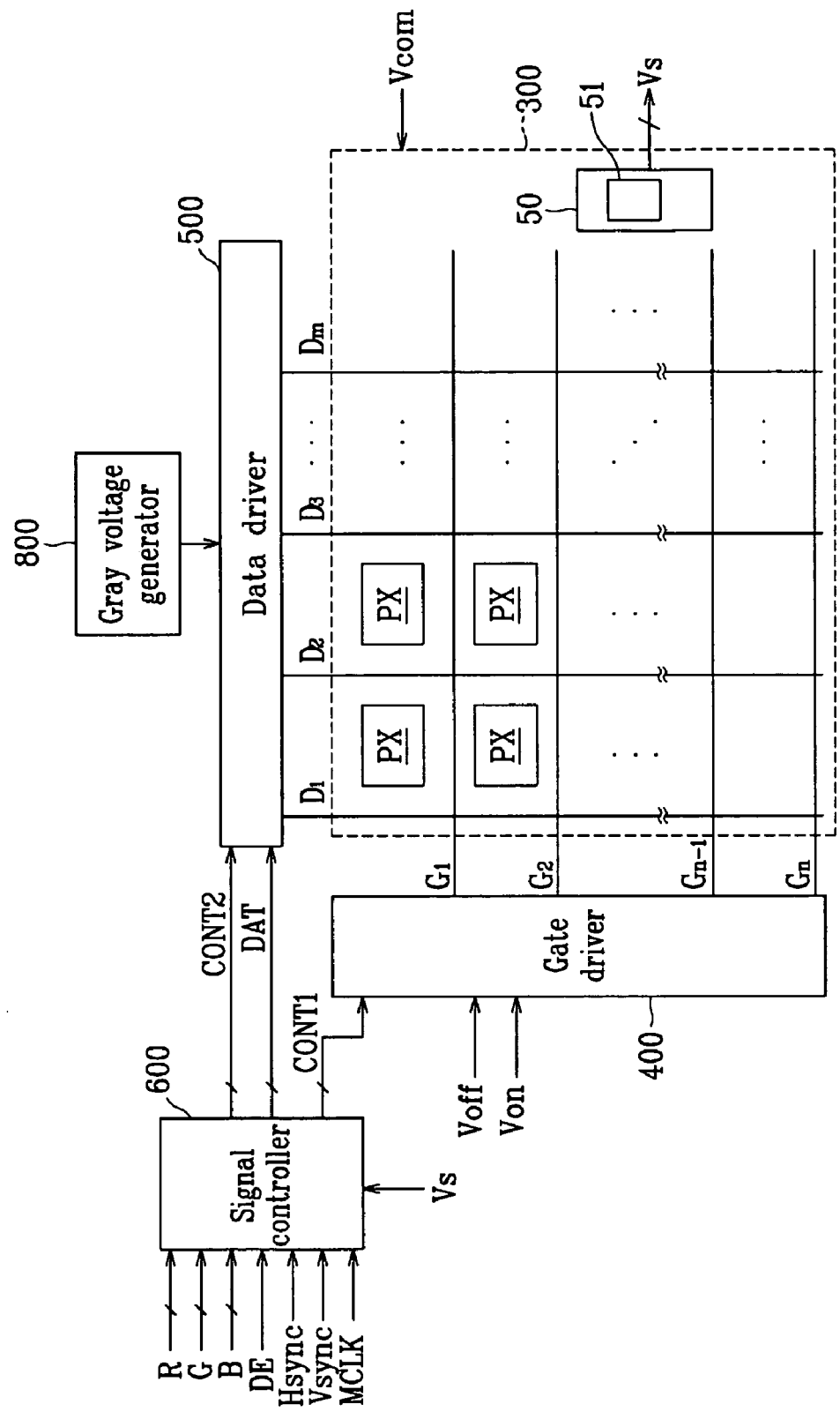
FIG. 1 is a block diagram of an LCD according to an embodiment of the present invention.

The present invention will be described more fully hereinafter with reference to the accompanying drawings, in which preferred embodiments of the inventions invention are shown. This invention may, however, be embodied in many different forms and should not be construed as limited to the embodiments set forth herein.

In the drawings, the thickness of layers and regions are exaggerated for clarity. Like numerals refer to like elements throughout. It will be understood that when an element such as a layer, film, region, substrate, or panel is referred to as being "on" another element, it can be directly on the other element or intervening elements may also be present.

Temperature sensors for a display device, thin film transistor array panels including the temperature sensors, and liquid crystal displays according to embodiments of the present invention will be described with reference to the drawings.

Figure 2:
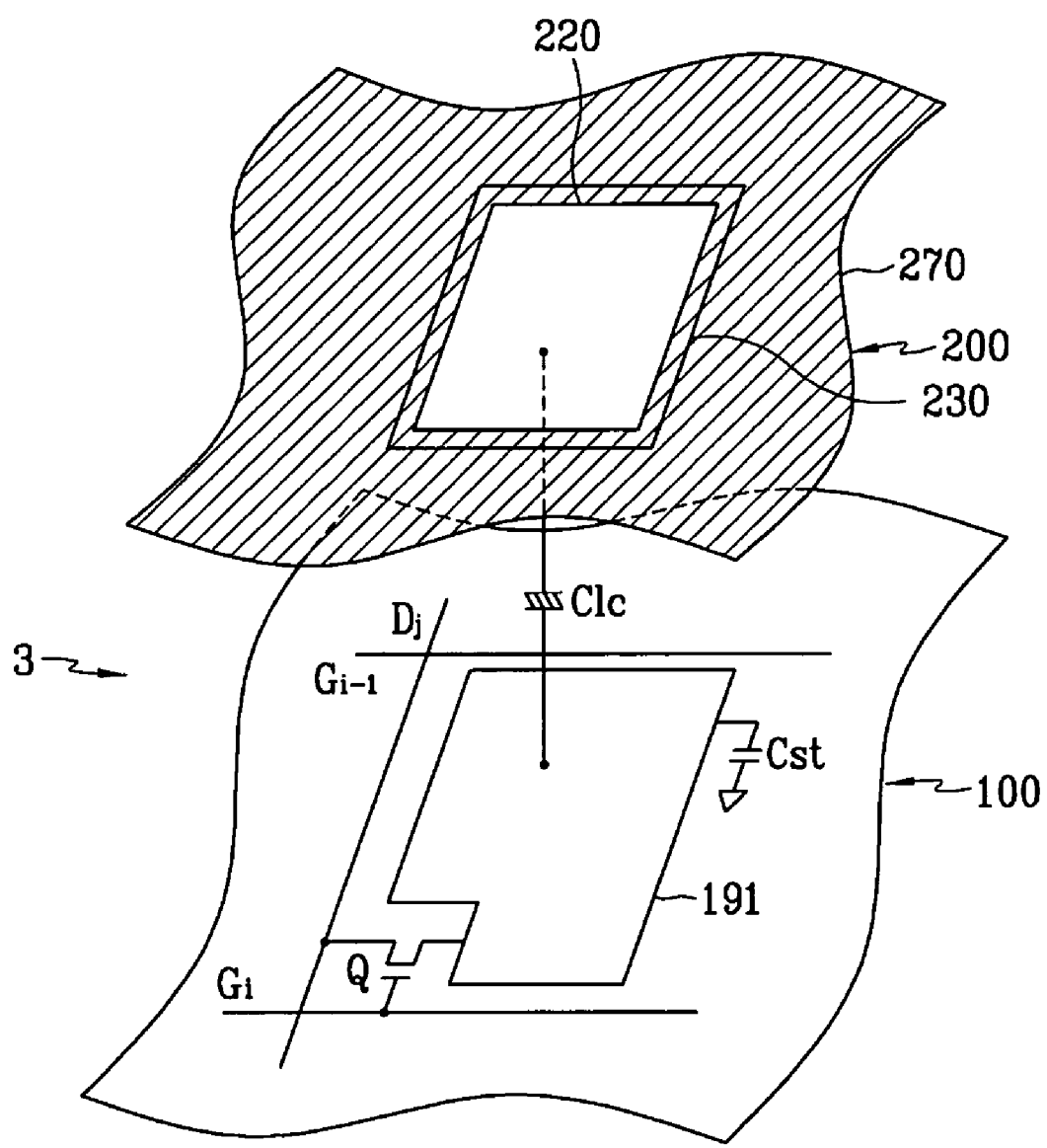
FIG. 2 is an equivalent circuit diagram of a pixel of an LCD according to an embodiment of the present invention.
Figure 3:
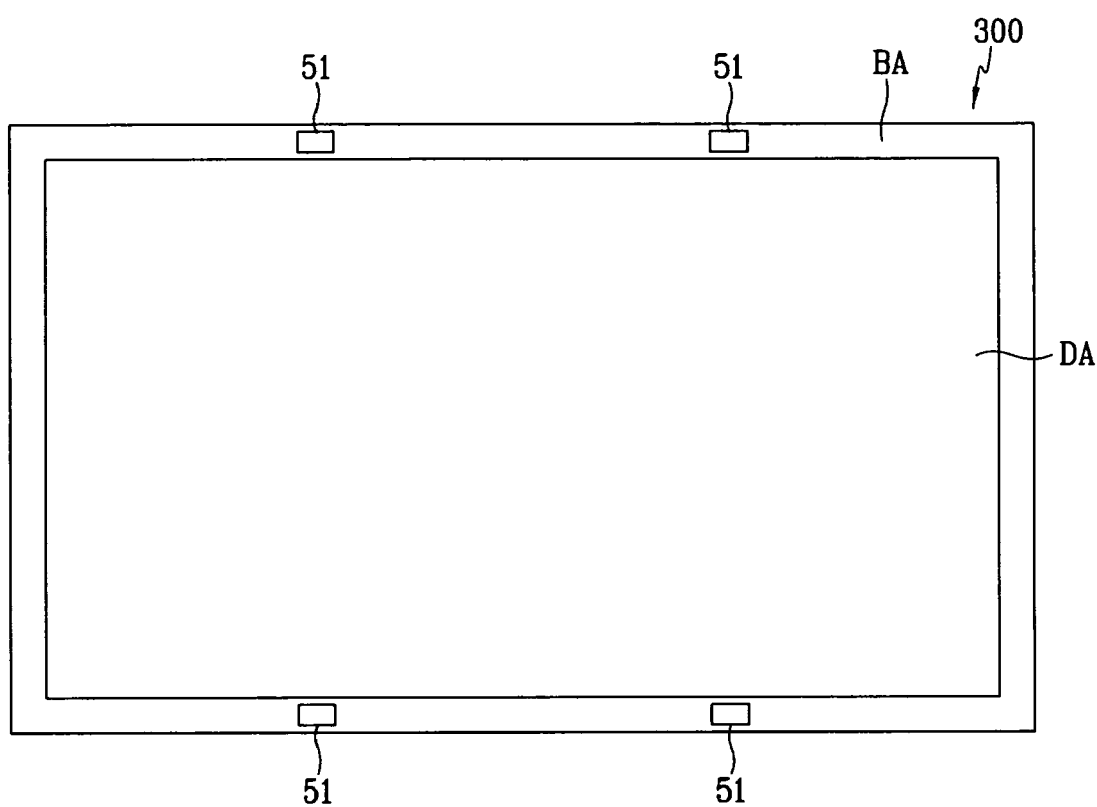
FIG. 3 is a perspective view of an LCD according to an embodiment of the present invention.

FIG. 1 is a block diagram of an LCD according to an embodiment of the present invention, FIG. 2 is an equivalent circuit diagram of a pixel of an LCD according to an embodiment of the present invention, and FIG. 3 is a perspective view of an LCD according to an embodiment of the present invention.

Referring to FIG. 1, an LCD according to an embodiment of the present invention includes an LC panel assembly 300, a gate driver 400 and a data driver 500 connected thereto, a gray voltage generator 800 connected to the data driver 500, and a temperature sensing unit 50 and a signal controller 600 controlling the above-described elements.

The LC panel assembly 300, in a structural view shown in FIG. 2, includes a lower panel 100, an upper panel 200, and an LC layer 3 interposed therebetween. The LC panel assembly 300 includes a plurality of display signal lines G1-Gn and D1-Dm and a plurality of pixels PX connected thereto and arranged substantially in a matrix format, as shown in FIGS. 1 and 2.

The display signal lines G1-Gn and D1-Dm are provided on the lower panel 100 and include a plurality of gate lines G1-Gn and a plurality of data lines D1-Dm. The gate lines G1-Gn transmit gate signals (also called scanning signals), and the data lines D1-Dm transmit data signals. The gate lines G1-Gn extend substantially in a first direction and are substantially parallel to each other, while the data lines D1-Dm extend substantially in a second direction and are substantially parallel to each other. The first direction and the second direction are substantially perpendicular to each other.

Each pixel PX, for example a pixel PX connected to the i_th gate line Gi (i=1, 2, . . . , m) and the j_th data line Dj (j=1, 2, . . . , m), includes a switching element Q connected to the signal lines Gi and Dj. Each pixel PX also includes an LC capacitor Clc and a storage capacitor Cst that are connected to the switching element Q. The storage capacitor Cst may be omitted if it is unnecessary.

The switching element Q such as a TFT is provided on the lower panel 100 and has three terminals: a control terminal connected to the gate lines Gi; an input terminal connected to the data lines Dj; and an output terminal connected to the LC capacitor Clc and the storage capacitor Cst.

The LC capacitor Clc includes a pixel electrode 191 provided on the lower panel 100 and a common electrode 270 provided on the upper panel 200, as two terminals. The LC layer 3 disposed between the two electrodes 191 and 270 functions as the dielectric layer of the LC capacitor Clc. The pixel electrode 191 is connected to the switching element Q, and the common electrode 270 is supplied with a common voltage Vcom. The common electrode 270 covers the entire surface of the upper panel 200. In some embodiments, the common electrode 270 may be provided on the lower panel 100 and the electrodes 191 and 270 may be shaped into bars or stripes.

The storage capacitor Cst is an auxiliary capacitor for the LC capacitor Clc. The storage capacitor Cst includes the pixel electrode 191 and a separate signal line (not shown) that is provided on the lower panel 100. The signal line overlaps the pixel electrode 191 with an insulator between the signal line and the pixel electrode 191 and is supplied with a predetermined voltage such as the common voltage Vcom. Alternatively, the storage capacitor Cst includes the pixel electrode 191 and an adjacent gate line called a previous gate line. In this case, the previous gate line and the pixel electrode 191 sandwich an insulator.

A color display may be implemented in a number of different ways. One method of implementation entails spatial division whereby each pixel uniquely represents a primary color such that the spatial sum of a group of pixels represents the desired color. Another method entails temporal division whereby each pixel sequentially represents different primary colors such that a temporal sum of the primary colors is recognized as the desired color. An exemplary set of primary colors includes red, green, and blue colors. FIG. 2 shows an example of the spatial division implementation in which each pixel includes a color filter 230 representing a primary color in an area of the upper panel 200 that is across the LC layer from the pixel electrode 191. Alternatively, the color filter 230 may be provided on or under the pixel electrode 191 on the lower panel 100.

As shown in FIG. 2, a light-blocking film 220 such as a black matrix for preventing light loss is formed on the upper panel 200, and has openings in areas corresponding to the pixel electrode 191 or the color filter 230.

A pair of polarizers (not shown) for polarizing the light are attached on the outer surfaces of the panels 100 and 200 of the panel assembly 300.

The gray voltage generator 800 generates two sets of gray voltages (or two sets of reference gray voltages) related to the transmittance of the pixels. The gray voltages in one set have a positive polarity with respect to the common voltage Vcom, while those in the other set have a negative polarity with respect to the common voltage Vcom.

The gate driver 400 is connected to the gate lines G1-Gn of the panel assembly 300, and it synthesizes the gate-on voltage Von and the gate off voltage Voff to generate gate signals for application to the gate lines G1-Gn.

The data driver 500 is connected to the data lines D1-Dm of the panel assembly 300, and it applies to the data lines D1-Dm data voltages selected from the gray voltages that are supplied by the gray voltage generator 800. If the gray voltage generator 800 supplies only the reference gray voltages of a predetermined number (as opposed to the gray voltages corresponding to all grays), the data driver 500 divides the reference gray voltages to generate the gray voltages corresponding to all grays and selects data voltages from the generated gray voltages.

The temperature sensing unit 50 is formed on the LC panel assembly 300 and includes a temperature sensor 51. The temperature sensor 51 generates a temperature sensing signal Vs corresponding to the sensed temperature and outputs the sensing signal Vs to the signal controller 600.

Referring to FIG. 3, the LC panel assembly 300 is divided into a display region DA and a peripheral region PA. The LC layer 3 is formed on the display region DA. The peripheral region PA is positioned mainly along the border of the LC panel assembly 300 and is covered by the light blocking member 220. The temperature sensors 51 of the temperature sensing unit 50 are installed on the peripheral region PA.

As shown in FIG. 3, there are four temperature sensors 51 formed on the LC panel assembly 300. In the particular embodiment that is shown, two temperature sensors 51 are positioned along one side of the LC panel assembly 300, and another two temperature sensors 51 are positioned along a different side of the LC panel assembly. However, the number and positions of the temperature sensors 51 are not limiting to the invention. For example, there may be more or fewer than four temperature sensors 51, and the temperature sensors 51 may be arranged differently on the LC panel assembly 300 to sense the temperature of the LC panel assembly 300.

The signal controller 600 controls the gate driver 400 and the data driver 500 based on the temperature sensing signal Vs from the temperature sensing unit 50.

The respective driving devices 400, 500, 600, and 800 may be implemented as an integrated circuit (IC) chip mounted on the panel assembly 300, be mounted on a flexible printed circuit (FPC) film as a tape carrier package (TCP) and attached to the LC panel assembly 300, or be mounted on a separate printed circuit board (PCB). Alternately, the driving devices 400, 500, 600, and 800 may be integrated into the panel assembly 300 along the display signal lines G1-Gn and D1-Dm and the TFT switching elements Q. As yet another alternative, the driving devices 400, 500, 600, and 800 may be implemented as an IC chip, and at least one of them or at least a circuit element included in them may be implemented outside of the IC chip.

As described above, the LC panel assembly 300 includes two panels 100 and 200, and the panel 100 having thin film transistors is called a TFT array panel. Since the temperature sensor 51 of the temperature sensing unit 50 is implemented on the TFT array panel 100, the TFT array panel 100 according to an embodiment of the present invention will be described in detail with reference to FIGS. 4 to 7.

Figure 4:
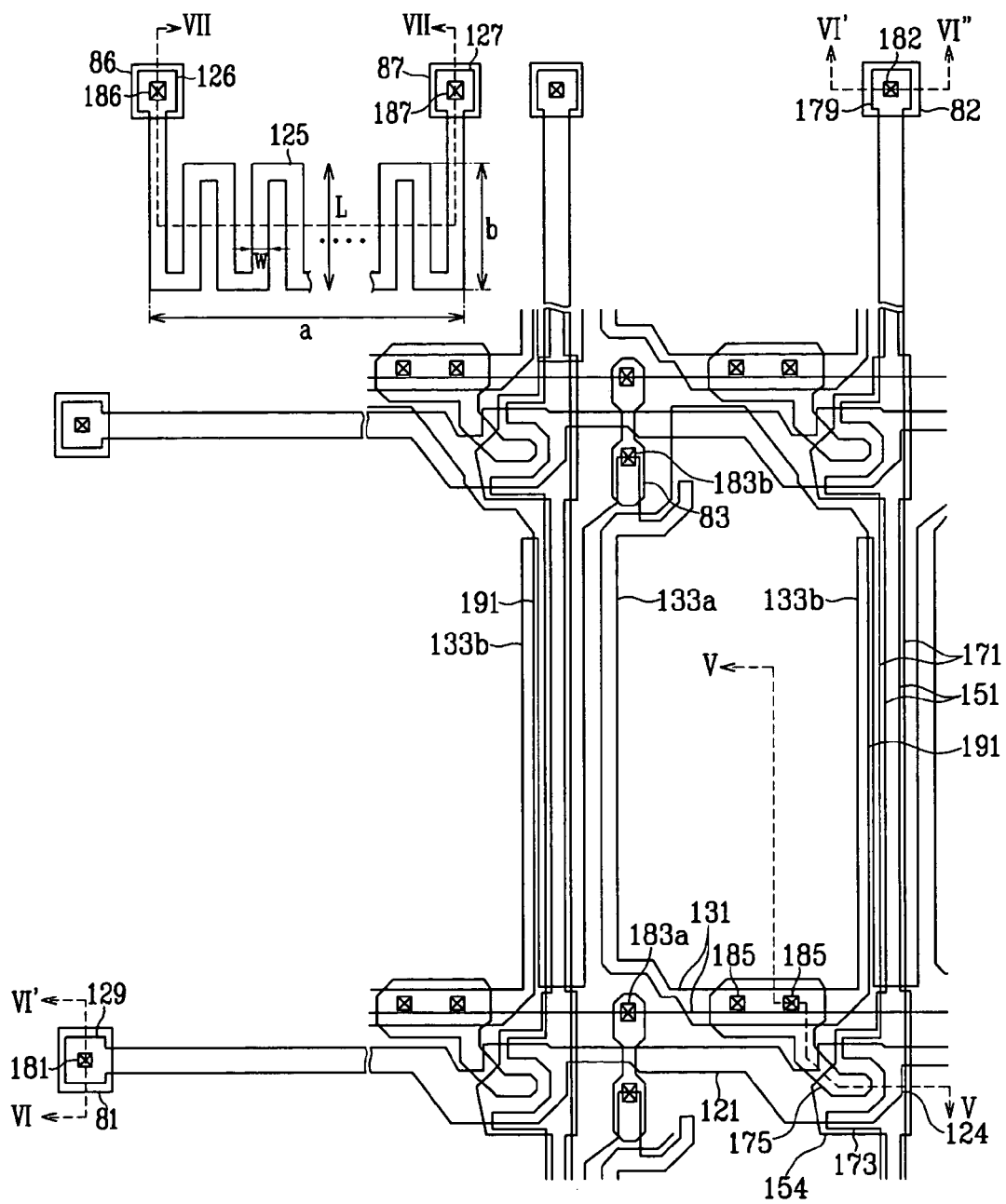
FIG. 4 is a layout view of a TFT array panel for an LCD according to an embodiment of the present invention.
Figure 5:
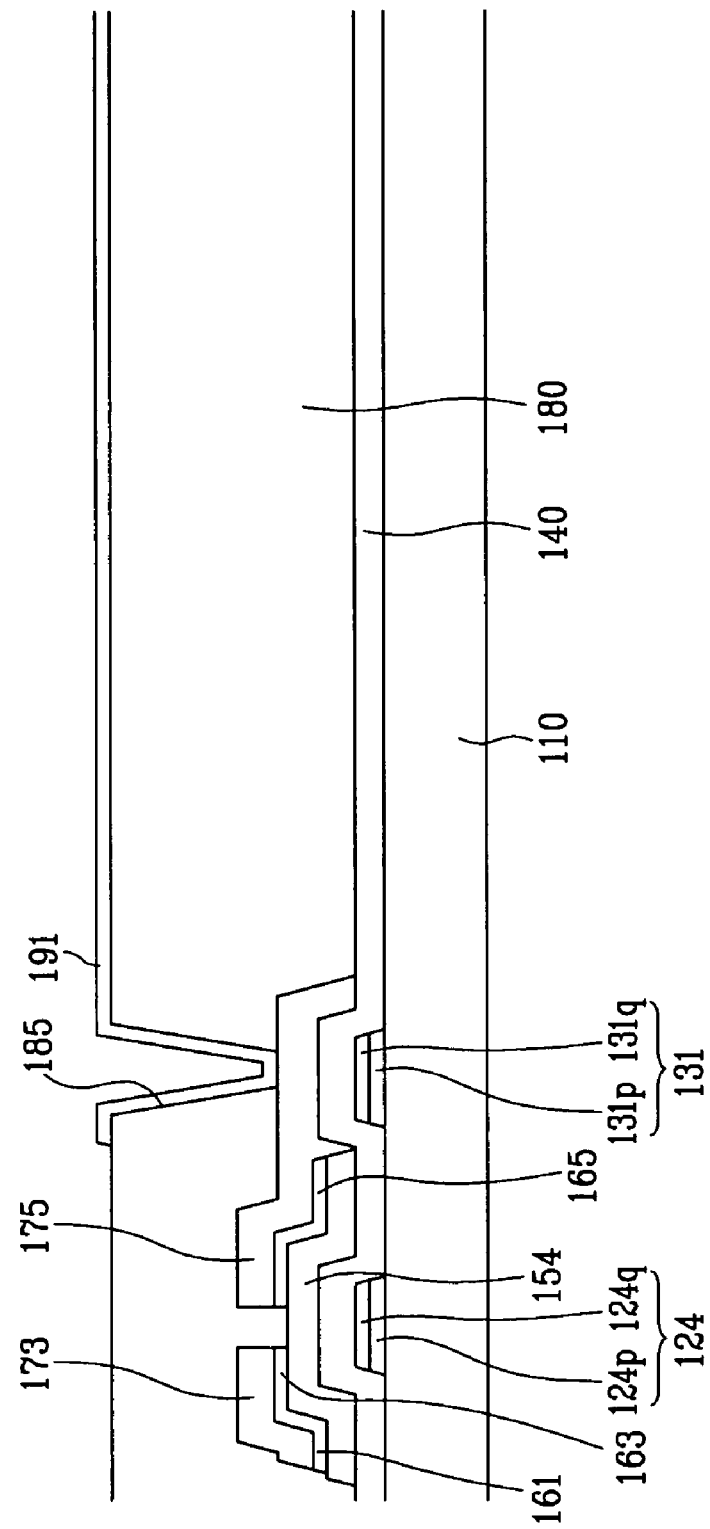
FIG. 5 is a sectional view of the LCD shown in FIG. 4 taken along the line V-V.
Figure 6:
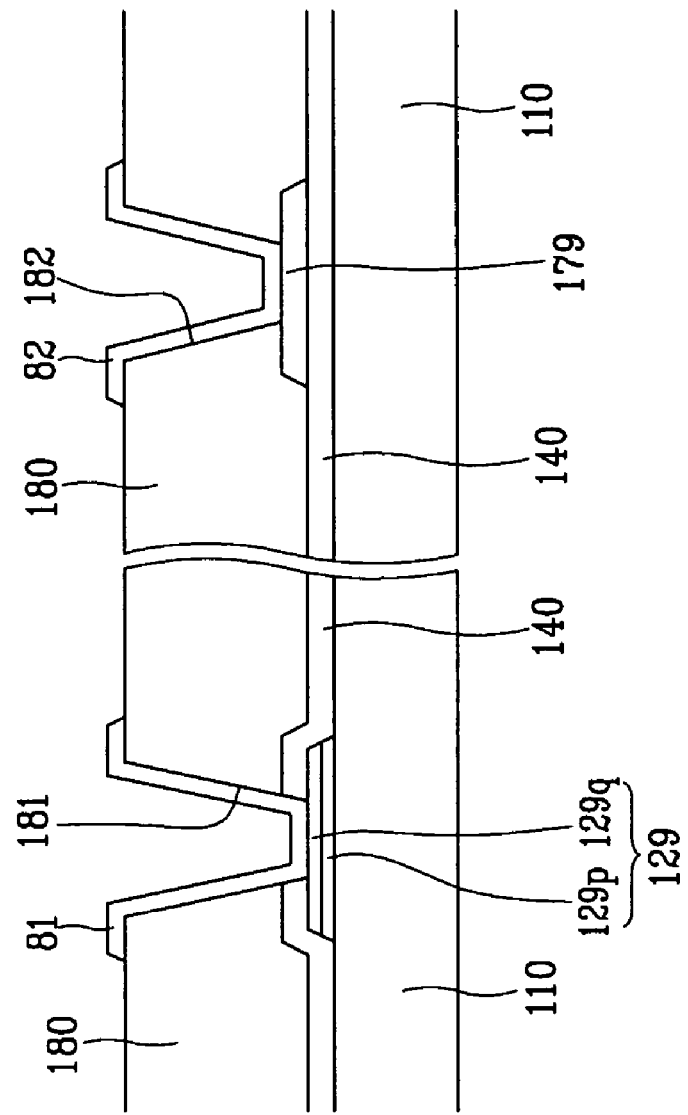
FIG. 6 is a sectional view of the LCD shown in FIG. 4 taken along the line VI-VI'-VI"
Figure 7:
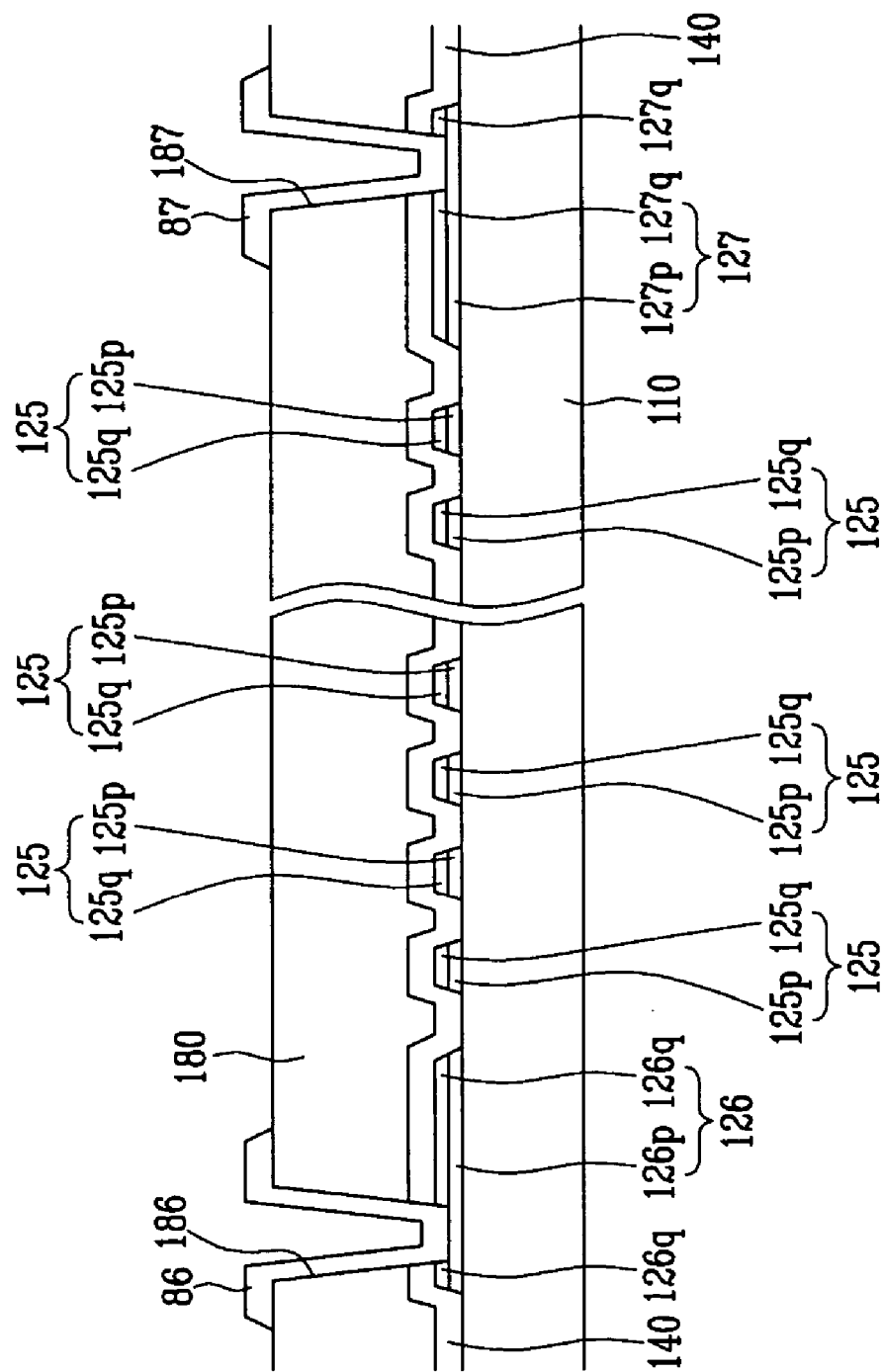
FIG. 7 is a sectional view of the LCD shown in FIG. 4 taken along the line VII-VII.

FIG. 4 is a layout view of a TFT array panel for an LCD according to an embodiment of the present invention, FIG. 5 is a sectional view of the LCD shown in FIG. 4 taken along the line V-V, FIG. 6 is a sectional view of the LCD shown in FIG. 4 taken along the line VI-VI'-VI", and FIG. 7 is a sectional view of the LCD shown in FIG. 4 taken along the line VII-VII.

A plurality of gate lines 121, a temperature sensing line 125, and a plurality of storage electrode lines 131 are formed on an insulating substrate 110 made of a material such as transparent glass or plastic.

The gate lines 121 transmit gate signals and extend substantially in the first direction. Each of the gate lines 121 includes a plurality of gate electrodes 124 and an end portion 129 having a large area for contact with another layer or an external driving circuit.

A gate driving circuit (not shown) for generating the gate signals may be mounted on a flexible printed circuit (FPC) film (not shown), which may be attached to the substrate 110, directly mounted on the substrate 110, or integrated into the substrate 110. The gate lines 121 may extend to be connected to a driving circuit that is integrated in the substrate 110.

The temperature sensing line 125 extends substantially in the transverse direction in the shape of rectangular waves. When the length of the temperature sensing line 125 is increased, the resistance and the sensitivity to temperature are also increased.

The temperature sensing line 125 includes two end portions 126 and 127 having a large area for contact with another layer or an external driving circuit on respective ends thereof. One end portion 126 functions as an input terminal for receiving a signal and the other end portion 127 functions as an output terminal for outputting the signal.

The storage electrode lines 131 are supplied with a predetermined voltage, and each of the storage electrode lines 131 has a portion that extends substantially parallel to the gate lines 121. A plurality of storage electrodes 133a and 133b branch from the portions of the storage electrode lines 131 that extend parallel to the gate lines 121. Each of the storage electrode lines 131 is disposed between two gate lines 121, and the portion of the storage electrode lines 131 that is parallel to the gate lines 121 is closer to one of the two neighboring gate lines 121 than the other. Each of the storage electrodes 133a and 133b has a fixed end portion and a free end portion. The fixed end portion of the storage electrode 133b is wide and connected to the portion of the storage electrode line 131 that is parallel to the gate lines 121. The fixed end portion has a linear branch and a curved branch extending from it. However, the particular shape of the storage electrode lines 131 shown herein is not a limitation of the invention and the storage electrode lines 131 may have different shapes and arrangements.

The gate lines 121, the temperature sensing line 125, and the storage electrode lines 131 include two conductive films that have different physical characteristics. The two conductive films are a lower film and an upper film disposed on the lower film. The lower film is preferably made of a low resistivity metal including an Al-containing metal such as Al or an Al alloy, an Ag-containing metal such as Ag or a Ag alloy, and a Cu-containing metal such as Cu or a Cu alloy, for reducing signal delay or voltage drop. The upper film is preferably made of a material that has good physical, chemical, and electrical contact characteristics with other materials such as indium tin oxide (ITO) or indium zinc oxide (IZO), such as a Mo-containing metal (Mo or a Mo alloy), Cr, Ta, or Ti. An example of the combination of the two films is a lower Al (alloy) film and an upper Mo (alloy) film.

In FIG. 5, the lower and upper films are denoted by additional characters p and q, respectively, for the gate electrodes 124, the temperature sensing line 125, and the storage electrode lines 131.

In some embodiments, the lower film is made of a good contact material and the upper film is made of a low resistivity material. In this case, the upper film 129q of the end portions 129 of the gate lines 121 and the upper film 126q and 127q of the end portions 126 and 127 of the temperature sensing line 125 may be removed to expose the lower films 129p, 126p, and 127p. In addition, the gate lines 121, the temperature sensing line 125, and the storage electrode lines 131 may include a single layer preferably made of the above-described materials. Alternatively, the gate lines 121, the temperature sensing line 125, and the storage electrode lines 131 may be made of some other suitable metal or conductor.

The lateral sides of the gate lines 121, the temperature sensing line 125, and the storage electrode lines 131 are inclined relative to the surface of the substrate 110 to form an inclination angle in the range of about 30-80 degrees. The gate lines 121, the temperature sensing line 125, and the storage electrode lines 131 are preferably formed by sputtering.

A gate insulating layer 140, which is preferably made of silicon nitride (SiNx) or silicon oxide (SiOx), is formed on the gate lines 121, the temperature sensing line 125, and the storage electrode lines 131.

A plurality of semiconductor stripes 151 (see FIG. 4), which are preferably made of hydrogenated amorphous silicon (abbreviated to "a-Si") or polysilicon, are formed on the gate insulating layer 140. The semiconductor stripes 151 extend in a direction that is substantially perpendicular to the direction in which the gate lines 121 extend, and they become wide near the gate lines 121 and the storage electrode lines 131. Thus, the semiconductor stripes 151 cover large areas of the gate lines 121 and the storage electrode lines 131. Each of the semiconductor stripes 151 includes a plurality of projections 154 branching out toward the gate electrodes 124.

A plurality of ohmic contact stripes 161 and islands 165 are formed on the semiconductor stripes 151. The ohmic contact stripes 161 and islands 165 are preferably made of n+ hydrogenated a-Si heavily doped with an N-type impurity such as phosphorous, or they may be made of silicide. Each ohmic contact stripe 161 includes a plurality of projections 163, and the projections 163 and the ohmic contact islands 165 are located in pairs on the projections 154 of the semiconductor stripes 151.

The lateral sides of the semiconductor stripes 151 and the ohmic contacts 161 and 165 are inclined relative to the surface of the substrate 110 to form inclination angles that are preferably in the range of about 30-80 degrees.

A plurality of data lines 171 and a plurality of drain electrodes 175 are formed on the ohmic contacts 161, 165 and the gate insulating layer 140.

The data lines 171 transmit data signals and extend substantially parallel to the semiconductor stripe 151 to intersect the gate lines 121, although the data lines 171 and the gate lines 121 are electrically isolated from each other. Each data line 171 also intersects the storage electrode lines 131 and runs between the storage electrodes 133a and 133b. Each data line 171 includes a plurality of source electrodes 173 and an end portion 179. The source electrodes 173 partially overlap the gate electrodes 124 and are shaped approximately into a crescent. The end portion 179 has a large area for contact with another layer or with a driving circuit. A data driving circuit (not shown) for generating the data signals may be mounted on an FPC film (not shown), which may be attached to the substrate 110, directly mounted on the substrate 110, or integrated into the substrate 110. The data lines 171 may extend to be connected to a driving circuit that is integrated in the substrate 110.

The drain electrodes 175 are separated from the data lines 171 and disposed across the gate electrodes 124 from the source electrodes 173. Each of the drain electrodes 175 includes a wide end portion and a narrow end portion. The wide end portion overlaps a storage electrode line 131 and the narrow end portion is partly enclosed by a source electrode 173.

A gate electrode 124, a source electrode 173, and a drain electrode 175 along with a projection 154 of the semiconductor stripe 151 form a TFT. The TFT has a channel formed in the projection 154 disposed between the source electrode 173 and the drain electrode 175.

The data lines 171 and the drain electrodes 175 are preferably made of a refractory metal such as Cr, Mo, Ta, Ti, or alloys thereof. However, they may have a multilayered structure including a refractory metal film (not shown) and a low resistivity film (not shown). Examples of the multi-layered structure are a double-layered structure including a lower Cr/Mo (alloy) film and an upper Al (alloy) film, and a triple-layered structure having a lower Mo (alloy) film, an intermediate Al (alloy) film, and an upper Mo (alloy) film. However, these are not limitations of the invention and the data lines 171 and the drain electrodes 175 may be made of any suitable metal(s) or conductor(s).

The data lines 171 and the drain electrodes 175 have inclined edge profiles such that the sidewall of the edges form an inclination angle of about 30-80 degrees.

The data lines 171 and the drain electrodes 175 may be formed by sputtering.

The ohmic contacts 161 and 165 are interposed only between the underlying semiconductor stripes 151 and the overlying conductors 171 and 175, and reduce the contact resistance between the layers. Although the semiconductor stripes 151 are narrower than the data lines 171 at most places, they become wider near the gate lines 121 and the storage electrode lines 131 as described above. This widening of the semiconductor stripes 151 helps to smooth out the surface, thereby reducing the likelihood of disconnection in the data lines 171. In plan view, the semiconductor stripes 151 covers substantially the same areas as the data lines 171 and the drain electrodes 175 as well as the underlying ohmic contacts 161 and 165. However, the semiconductor stripes 151 include some portions that are not covered by the data lines 171 and the drain electrodes 175, such as the portions located between the source electrodes 173 and the drain electrodes 175.

A passivation layer 180 is formed on the data lines 171, the drain electrodes 175, and the exposed portions of the semiconductor stripes 151. The passivation layer 180 is preferably made of an inorganic or organic insulator and it may have a flat surface. Examples of the inorganic insulator include silicon nitride and silicon oxide. The organic insulator may have photosensitivity and a dielectric constant of less than about 4.0. The passivation layer 180 may include a lower film of an inorganic insulator and an upper film of an organic insulator. The dual-film structure is advantageous in that it imparts to the passivation layer 180 the insulating characteristics of the organic insulator while preventing the exposed portions of the semiconductor stripes 151 from being damaged with the organic insulator.

The passivation layer 180 has a plurality of contact holes 182 and 185 exposing the end portions 179 of the data lines 171 and the drain electrodes 175, respectively. The passivation layer 180 and the gate insulating layer 140 have a plurality of contact holes. Contact holes 181 exposes the upper film 129q of the end portions 129 of the gate lines 121. Contact holes 186 and 187 respectively expose the upper films 126q and 127q of the end portions 126 and 127 of the temperature sensing line 125. A plurality of contact holes 183a expose portions of the storage electrode lines 131 near the fixed end portions of the storage electrodes 133b, and a plurality of contact holes 183b expose the linear branches of the free end portions of the storage electrodes 133b.

A plurality of pixel electrodes 191, a plurality of overpasses 83, and a plurality of contact assistants 81, 82, 86, and 87 are formed on the passivation layer 180. They are preferably made of a transparent conductor such as ITO or IZO, or a reflective conductor such as Ag, Al, Cr, or alloys thereof.

The pixel electrodes 191 are physically and electrically connected to the drain electrodes 175 through the contact holes 185 such that the pixel electrodes 191 receive data voltages from the drain electrodes 175. Upon receiving the data voltage, the pixel electrodes 191, together with the common electrode 270 of the color filter panel 200 that is supplied with a common voltage, generates an electric field in the liquid crystal layer. The electric field determines the orientations of liquid crystal molecules (not shown) in the liquid crystal layer 3 disposed between the two panels 100 and 200. The pixel electrode 191 and the common electrode 270 form a capacitor referred to as a "liquid crystal capacitor," which stores applied voltages after the TFT is turned off.

The pixel electrode 191 overlaps the storage electrode line 131 and the storage electrodes 133a and 133b. The pixel electrode 191, a drain electrode 175 connected thereto, and the storage electrode line 131 form an additional capacitor referred to as a "storage capacitor." The storage capacitor enhances the voltage storing capacity of the liquid crystal capacitor.

The pixel electrode 191 overlaps a neighboring gate line 121 to enhance the aperture ratio, The contact assistants 81, 82, 86, and 87 are connected to the end portions 129 of the gate lines 121, the end portions 126 and 127 of the temperature sensing line 125, and the end portions 179 of the data lines 171 through the contact holes 181, 182, 186, and 187, respectively. The contact assistants 81, 82, 86, and 87 protect the end portions 129, 126, 127, and 179 and enhance the adhesion between the end portions 129, 126, 127, and 179 and external devices.

The overpasses 83 are formed over the gate lines 121. The overpasses 83 are connected to the exposed portions of the storage electrode lines 131 and the exposed linear branches of the free end portions of the storage electrodes 133b through the contact holes 183a and 183b, respectively. The contact holes 183a and 183b are disposed across one of the gate lines 121 from each other. The storage electrodes 133a and 133b along with the overpasses 83 can be used for repairing defects in the gate lines 121, the data lines 171, or the TFTs.

The temperature sensing line 125 formed along with the gate line 121 is a resistor with a variable resistance value that depends on the temperature. Therefore, the temperature sensing line 125 functions as the temperature sensor 51.

The temperature sensing line 125 may be formed to have a width a that is about 2 mm or less and a length b of about 2 mm or less. "a" and "b" are marked in FIG. 4.

The temperature sensing line 125 is formed with the same metal as those metal that is used to form the gate lines 121 by sputtering. As this metal has good surface stability, breakages of a surface of the temperature sensing line 125 is unusual and the temperature sensing line 125 is less likely to produce erroneous readings.

The temperature sensor shown in FIGS. 4 to 7 is represented by an equivalent circuit diagram shown in FIG. 8, which is described in detail below.

Figure 8:
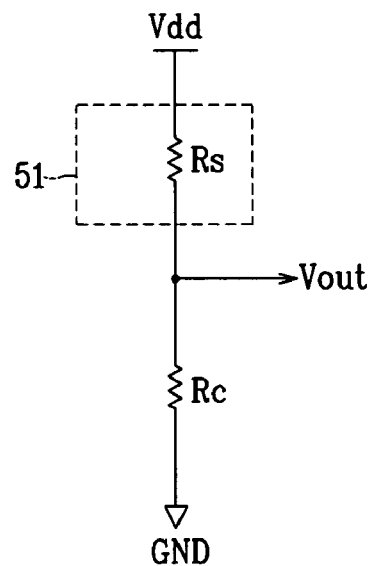
FIG. 8 is an equivalent circuit diagram of a temperature sensor according to an embodiment of the present invention.

FIG. 8 is an equivalent circuit diagram of a temperature sensor according to an embodiment of the present invention.

Referring to FIG. 8, the temperature sensor 51 may be expressed as a resistor Rs connected to a driving voltage Vdd, and a resistor Rc connected between the temperature sensor 51 and a ground terminal. The resistor Rc is a fixed-value resistor.

The temperature sensor 51 is supplied with the driving voltage Vdd from the end portion 126 of the temperature sensing line 125, and outputs an output signal Vout as the temperature sensing signal Vs through the end portion 127 connected to the resistor Rc.

The output signal Vout is obtained as below.

$$Vout = \frac{Rc}{Rs + Rc} Vdd \qquad \text{[Equation 1]}$$

Rs is expressed as:

$$Rs = \rho \frac{L}{WD}$$

and ρ is expressed as:

$$\rho(\rho_o(1+\alpha T)$$

Here, ρ is resistivity of the temperature sensing line 125, W is a width of the temperature sensing line 125, L is a length of the temperature sensing line 125, and D is a thickness of the temperature sensing line 125. In addition, $\rho_o$ is resistivity at a predetermined temperature, for example about 20° C., α is a temperature coefficient of resistance (TCR), that is, a coefficient representing a resistance value variation with respect to a temperature variation, and T is temperature.

The resistivity $\rho_o$ and the temperature coefficient α are a constant of a predetermined value, and the width W, the length L, and the thickness D is defined as designed.

As a result, a resistance value of the resistor Rs varies based on the temperature T. Thus, the voltage of the output signal Vout also varies based on the temperature.

As described above, the width W, the length L, and the thickness D of the temperature sensing line 125 are defined when the temperature sensor 51 is designed, and characteristics of the temperature sensor 51 are defined at least partly by these measurements.

When the temperature sensor 51 is made of Al, Cu, Pt, Cr, or Mo, the resistivities $\rho_o$ and the temperature coefficients α are as illustrated below.

TABLE

| Meta | ρo(10$^{-8}$ Ωcm) | α(10$^{-4}$/k) |
|---|---|---|
| Al | 2.69 | 42.0 |
| Cu | 1.67 | 43.0 |
| Pt | 10.6 | 39.2 |
| Cr | 12.1 | — |
| Mo | 5 | — |

For obtaining good sensitivity and stability of the temperature sensor 51, it is preferable that the temperature coefficient α be large and consistent. The temperature sensor 51 is preferably made of a metal whose resistance ρ has a linear relationship with temperature variation.

When the temperature sensor 51 is manufactured as the temperature sensing line 125 shown in FIGS. 4 to 7, the output signal Vout from the temperature sensor 51 changes with temperature T as described below.

Figure 9:
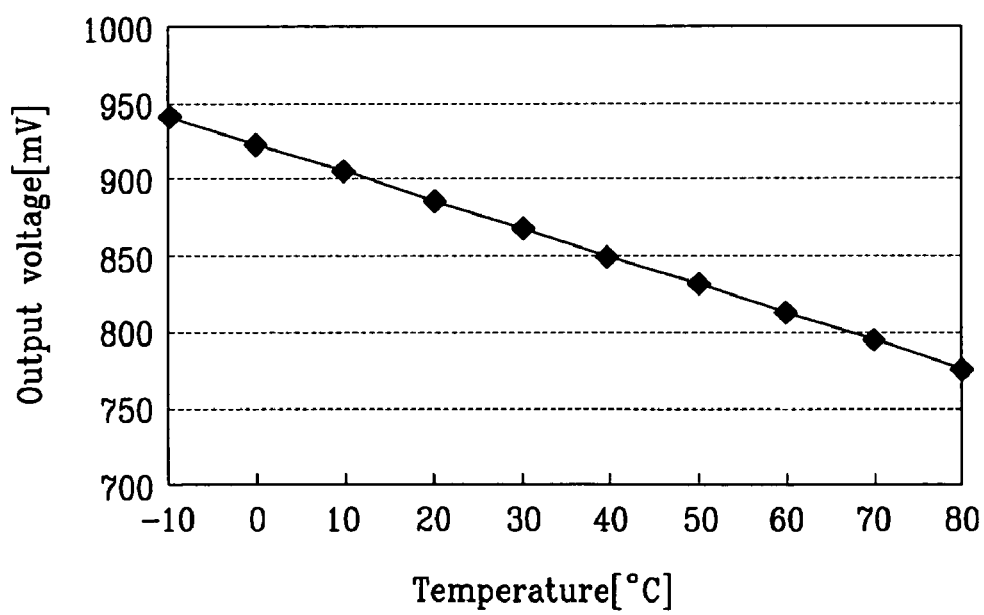
FIG. 9 is a graph showing a characteristic of an output voltage with respect to a temperature variation of a temperature sensor according to an embodiment of the present invention.

FIG. 9 is a graph showing the output voltage as a function of temperature as measured by a temperature sensor according to an embodiment of the present invention.

The graph of FIG. 9 was produced using a temperature sensing line 125 that has a dual-layered structure. The lower film contained Al and the upper film contained Mo, the driving voltage Vdd was about 2V, and the resistance value of the resistor Rc was about 1.7 kΩ.

As shown in FIG. 9, the output voltage Vout linearly varies with temperature at a range of about −10° C. to about 80° C. The temperature sensor 51 with the temperature sensing line 125 has sensitivity of about 1.83 (mV/C.°). Thus, the output voltage Vout may be directly used without extra signal processing such as amplification by a separate amplifier.

The temperature sensing line 125 may be formed from the same layer as the data lines 171 or the electric pixels 191. The temperature sensing line 125 may have a triple-layered structure with a lower Mo (alloy) film, an intermediate Al (alloy) film, and an upper Mo (alloy) film. However, any metal that has a large temperature coefficient α, produces consistent results across different runs, and has a resistivity ρ that linearly varies with the temperature T may be used for the temperature sensing line 125.

Now, the operation of the LCD will be described in detail.

The signal controller 600 is supplied with RGB image signals R, G, B and input control signals for controlling the display of the RGB image signals R, G, B from an external graphics controller (not shown). The input control signals include a vertical synchronization signal Vsync, a horizontal synchronization signal Hsync, a main clock signal MCLK, and a data enable signal DE. The signal controller 600 also receives the temperature sensing signal Vs from the temperature sensing unit 50.

The signal controller 600 generates gate control signals CONT1 and data control signals CONT2 and processes the image signals R, G, B to make them suitable for the operation of the panel assembly 300 on the basis of the input control signals. Then, the signal controller 600 provides the gate control signals CONT1 to the gate driver 400 and the processed image signals DAT and the data control signals CONT2 to the data driver 500. The signal controller 600 controls the gate driver 400 and the data driver 500 based on the temperature sensing signal. The operation of the signal controller 600 will be described in detail below.

The gate control signals CONT1 include a scanning start signal STV for instructing to start scanning and at least a clock signal for controlling the output time of the gate-on voltage Von. The gate control signals CONT1 may further include an output enable signal OE for defining the duration of the gate-on voltage Von.

The data control signals CONT2 include a horizontal synchronization start signal STH for informing the start of data transmission for a group of pixels, a load signal LOAD for instructing to apply the data voltages to the data lines D1-Dm, and a data clock signal HCLK. The data control signal CONT2 may further include an inversion signal RVS for reversing the polarity of the data voltages (with respect to the common voltage Vcom).

In response to the data control signals CONT2 from the signal controller 600, the data driver 500 receives a packet of the image data DAT for a group of pixels from the signal controller 600. The data driver 500 converts the image data DAT into analog data voltages selected from the gray voltages that are supplied by the gray voltage generator 800, and applies the data voltages to the data lines D1-Dm.

The gate driver 400 applies the gate-on voltage Von to the gate line G1-Gn in response to the gate control signals CONT1 from the signal controller 600. In response to the gate-on voltage Von being applied to the gate lines G1-Gn, the switching elements Q are turned on. The data voltages applied to the data lines D1-Dm are supplied to the pixels through the activated switching elements Q.

The difference between the data voltage and the common voltage Vcom is represented as a voltage across the LC capacitor Clc, which is sometimes referred to as the pixel voltage. The orientations of the LC molecules in the LC capacitor Clc depend on the magnitude of the pixel voltage, and the molecular orientations determine the polarization of light passing through the LC layer 3. The polarizer(s) translates light polarization into light transmittance.

By repeating this procedure by a unit of the horizontal period (which is denoted by "1H" and is equal to one period of the horizontal synchronization signal Hsync and the data enable signal DE), all gate lines G1-Gn are sequentially supplied with the gate-on voltage Von during a frame. Thus, the data voltages are applied to all pixels. When the next frame starts after finishing one frame, the inversion control signal RVS applied to the data driver 500 is controlled such that the polarity of the data voltages is reversed (which is referred to as "frame inversion"). Alternatively, the inversion control signal RVS may also be controlled such that the polarity of the data voltages flowing in a data line in one frame are reversed (for example, line inversion and dot inversion). As yet another alternative, the polarity of the data voltages in one packet are reversed (for example, column inversion and dot inversion).

As described above, the operational characteristics of the liquid crystal or elements of driving circuits in accordance with the temperature of the LCD vary widely. Thus, compensation operations based on the temperature of the LCD needed are also adjusted by taking these wide variations into account. Examples of the compensation operations are DCC (dynamic capacitance compensation) and an adjusting operation of a magnitude of the gate-on voltage Von.

As the characteristics of the liquid crystals vary in accordance with temperature, the response time of the liquid crystals also change. In DCC controlling for enhancing the response time of the liquid crystal, the signal controller 600 controls the DCC based on the temperature determined by the temperature-sensing signal Vs.

A threshold voltage of the switching element Q is changed in accordance with the temperature. Therefore, the signal controller 600 varies the magnitude of a reference voltage for generating the gate-on voltage Von based on the temperature. This way, the gate-on voltage is adjusted such that the period during which the switching element Q is turned on, which changes with temperature, is appropriately controlled.

Among the above compensation operations, the DCC of the signal controller 600 will be described with reference to FIG. 10.

Figure 10:
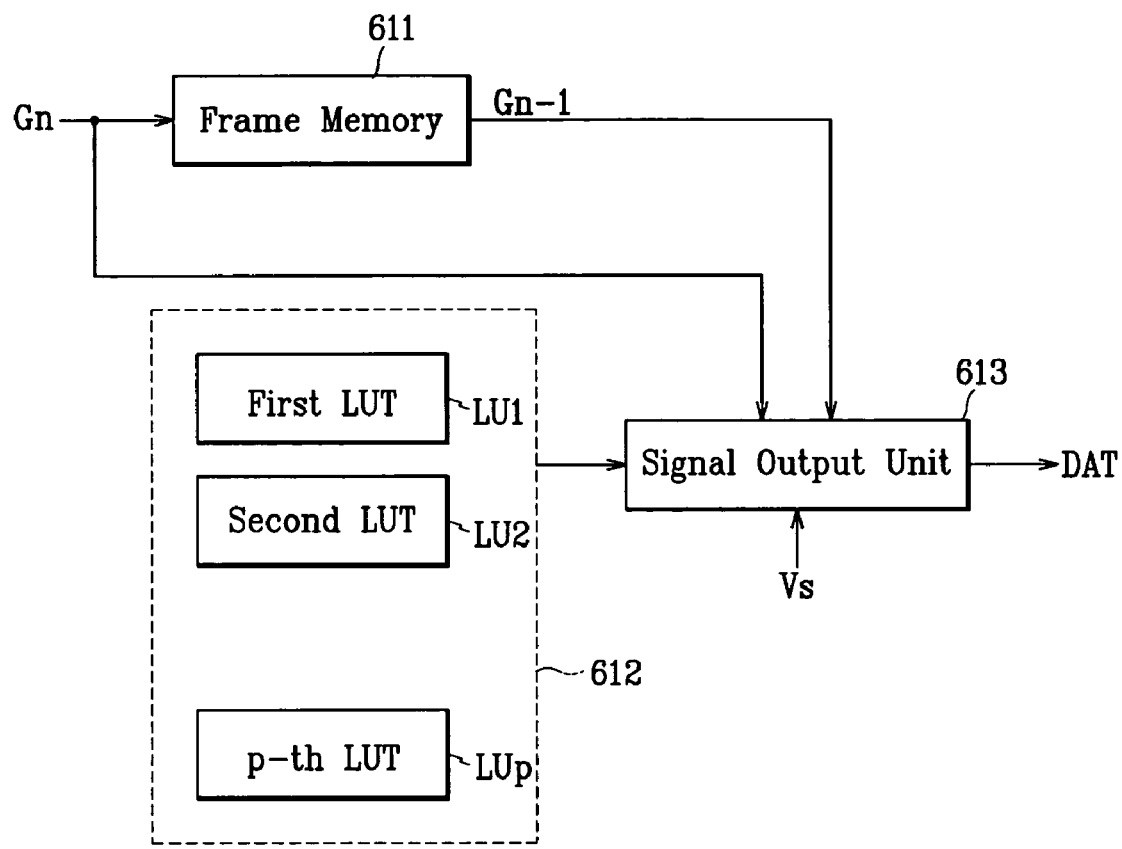
FIG. 10 is a block diagram of a signal controller according to another embodiment of the present invention.

FIG. 10 is a block diagram of a signal controller according to another embodiment of the present invention.

Referring to FIG. 10, the signal controller 600 includes a frame memory 611, a look-up table unit 612, and a signal output unit 613. The frame memory 611 is supplied with an image signal (hereinafter, called a "current image signal") Gn of a frame for any pixel. The signal output unit 613 is connected to the frame memory 611 and the look-up table unit 612, and is supplied with the temperature sensing signal Vs and the current image signal.

The frame memory 611 applies an image signal (hereinafter, called a "previous image signal") Gn−1 for a previous frame for the pixel to the look-up table unit 612 and the signal output unit 613. The current image signal Gn received from an external device is stored.

The look-up table unit 612 includes a plurality of look-up tables LU1-LUp. The respective look-up tables LU1-LUp store a plurality of amended image signals having values defined based on the temperature sensing signal Vs from as a function of the previous image signal Gn−1 and the current image signal Gn. The amended image signal is defined based on experimental results considering the temperature of the LC panel assembly 300, the difference between the current image signal and the previous image signal, and so on. The difference between the amended image signal and the previous image signal is larger than the difference between the current image signal before the amendment and the previous image signal.

The operation of the signal controller 600 will now be described in detail.

The signal controller 600 determines the temperature based on the temperature sensing signal Vs from the temperature sensing unit 50, and selects one of the look-up tables LU1-LUp depending on the determined temperature. For example, the signal output unit 613 may select the first look-up table LU1 when the determined temperature falls within a first range, and the signal output unit 613 may select the p_th look-up table LUp when the determined temperature falls within a p_th range.

The signal output unit 613 selects a corresponding amended image signal based on the current image signal Gn received from the outside and the previous image signal Gn−1 from the frame memory 611. The selected amended image signal is applied as an image signal DAT to the data driver 500.

Accordingly, the magnitude of the data voltage applied to the respective pixel is larger or smaller than that of a target data voltage that is defined as the current image signal. This way, the amount of time needed to reach a desired pixel voltage may be reduced.

In some embodiments, the look-up table may store just the amended image signals (hereinafter, called "reference amended image signals") with respect to previous image signals (hereinafter, called "reference previous image signals") of the predetermined number and with regular intervals and amended image signals (hereinafter, called "reference current image signals") of the predetermined number respectively corresponding to the reference previous image signals instead of the amended image signals corresponding to the previous image signals Gn−1 and the current image signals Gn for all pixels. By interpolation using the reference previous image signals and the reference current image signals, other amended image signals are calculated. By doing so, the size of the look-up table is decreased.

The temperature sensor according to an embodiment of the present invention may be used in plasma display panels (PDPs) or organic light emitting displays OLEDs as well as in the LCD, for sensing the temperature of the display panel.

The present invention allows stable temperature detection since a temperature sensor is manufactured using a metal instead of semiconductors having large optical reactivity. By not using semiconductors with large optical reactivity, the effect of light on temperature detection is minimized.

In the invention, a separate shielding film for shielding incident light is unnecessary. Thus, the manufacturing process and the structure of the temperature sensor as well as the overall structure are simplified.

Since the temperature sensor is directly integrated into the LC panel assembly along with the gate lines and data lines, the temperature measured by the temperature sensor is substantially close to the actual temperature of an LC layer, enhancing the accuracy of temperature compensation. This accuracy enhancement is achieved without a large increment of manufacturing cost.

In addition, the image signals are applied to pixels based on the sensed temperature that is similar to that of the LC layer. Thus, the response time of the liquid crystals to improve image quality of display devices is shortened. By directly integrating the temperature sensor into the LC panel assembly, the manufacturing cost is decreased because a separate temperature sensor to be externally installed on the LCD is unnecessary.

Since the temperature sensor is manufactured with metals that are not sensitive to light, rate of errors due to incident light from the outside is decreased. Since a separate structure for shielding the incident light is unnecessary, the manufacturing process and the structure of the temperature sensor are simplified.

Further, as mentioned above, the chances of breakage and erroneous readings is decreased since the temperature sensor is manufactured with metal lines having good surface stability.

A system for adjusting for flicker using the above-described temperature sensor according to another embodiment of the present invention will be described with reference to FIGS. 11 to 16B.

Figure 11:
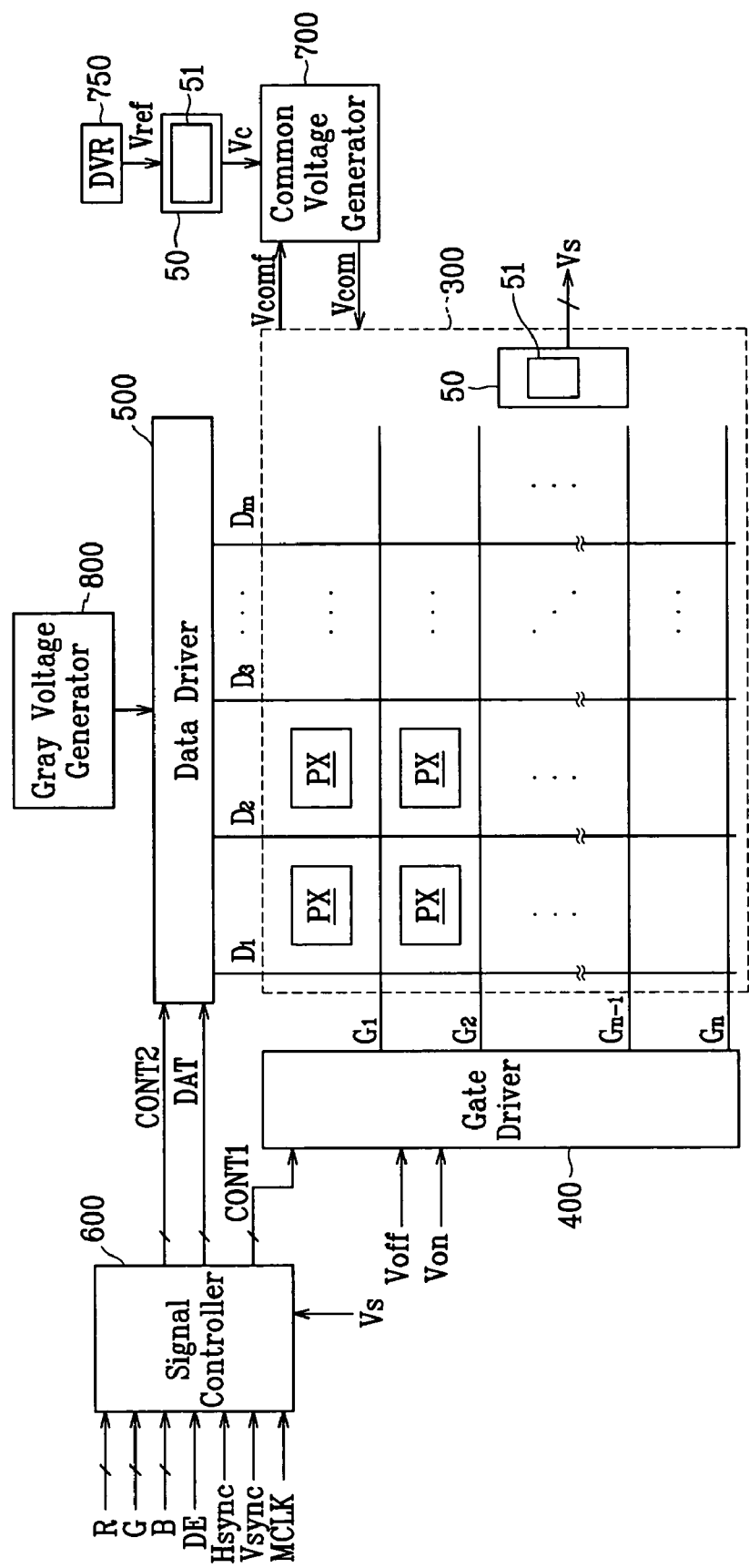
FIG. 11 is a block diagram of an LCD according to another embodiment of the present invention.
Figure 12:
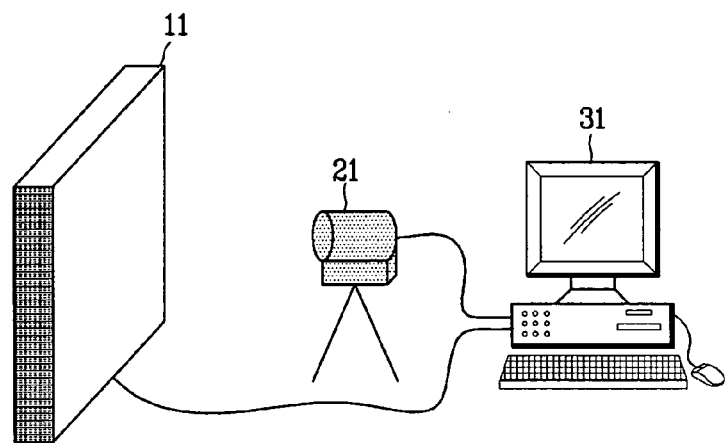
FIG. 12 shows a flicker adjusting system of an LCD according to another embodiment of the present invention.
Figure 13:
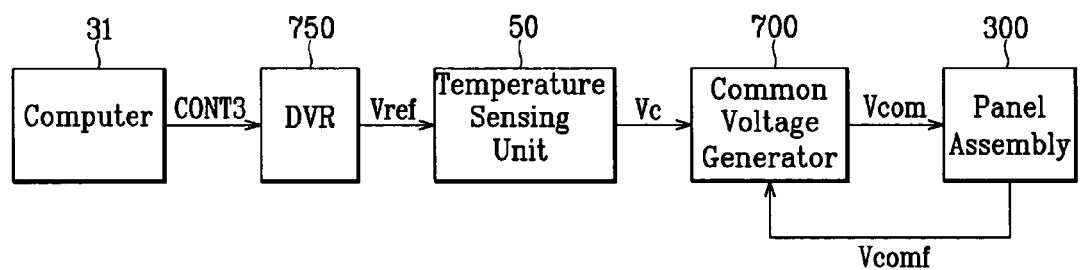
FIG. 13 is a block diagram showing a flicker adjusting system of an LCD according to another embodiment of the present invention.
Figure 14:
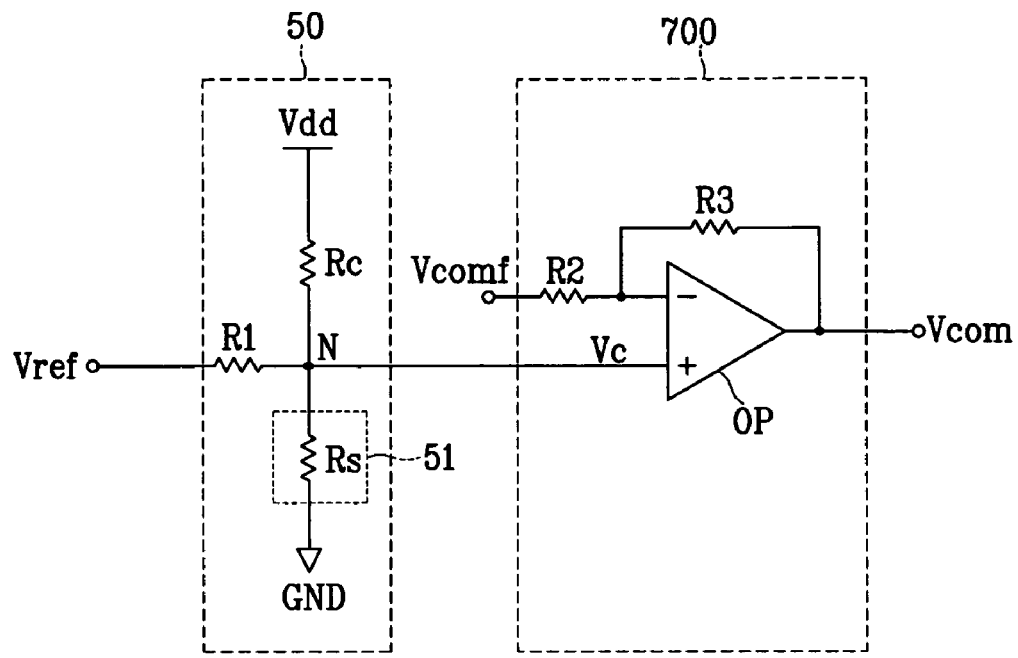
FIG. 14 shows examples of circuit diagrams of a temperature sensing unit and a common voltage generator shown in FIG. 13.

FIG. 11 is a block diagram of an LCD according to another embodiment of the present invention, FIG. 12 is a diagram of a flicker adjusting system for an LCD according to another embodiment of the present invention, FIG. 13 is a block diagram showing a flicker adjusting system of an LCD according to another embodiment of the present invention, and FIG. 14 shows examples of circuit diagrams of a temperature sensing unit and a common voltage generator shown in FIG. 13.

An LCD shown in FIG. 11 is substantially the same as the LCD shown in FIG. 1, and thus any redundant description will be omitted. Unlike the LCD of FIG. 1, the LCD of this embodiment includes a common voltage generator 700 and a digital variable resistor (DVR) 750 for generating the common voltage Vcom. The common voltage generator 700 transmits the common voltage Vcom to the LC panel assembly 300 for supply and connection to a temperature sensing unit 50. The temperature sensor may be a portion of the temperature sensing unit 50 shown in FIG. 3. That is, the portion thereof may supply the temperature sensing signal Vs to the signal controller and the rest thereof may be connected between the DVR 750 and the common voltage generator 700.

The DVR 750 generates a reference voltage Vref for supply to the temperature sensing unit 50 based on values stored in memories thereof (not shown), and it may be an integrated circuit.

The common voltage generator 700 generates the common voltage Vcom based on a compensation voltage Vc from the temperature sensing unit 50 and receives a common voltage Vcomf that is output by the LC panel assembly 300. In this case, the reference voltage Vref, which can be used to reduce the flicker of an LCD, is stored in the memory of the DVR 750.

Referring to FIGS. 12 to 14, a flicker adjusting system according to another embodiment of the present invention includes an LCD 11, a photographing device 21, and a computer 31.

The LCD 11 takes a final test for testing a flicker, and is connected to the computer 31.

The photographing device 21 is also connected to the computer 31, and it photographs a portion of a screen or an entire screen of the LCD 11. The photographing device 21 measures the luminance of the screen so that the measured luminance may be converted into an electric signal. In some embodiments, the electric signal may be a voltage that is transmitted to the computer 31.

The computer 31 is connected to the DVR 750 of the LCD 11, and the DVR 750 outputs the reference voltage 750 depending on a control signal CONT3 from the computer 31. The computer 31 and the DVR 750 are interconnected by an I²C interface.

The temperature sensing unit 50 includes the temperature sensor Rs and the constant resistor Rc shown in FIG. 8, and further includes a constant resistor R1 for receiving the reference voltage Vref. In this case, note that the positions of the temperature sensor Rs and the constant resistor Rc with respect to the driving voltage Vdd and the ground voltage GND in the temperature sensing unit 50 are reversed from the embodiment of FIG. 8. This change in the positions causes the output voltage Vout in FIG. 9 to be higher.

The common voltage generator 700 may include an operational amplifier OP which may be a differential amplifier. The noninverting terminal (+) of the operation amplifier OP is connected to a node N. The inverting terminal (−) is connected to the feedback common voltage Vcomf via the resistor R2 and an output terminal via the resistor R3.

A voltage inputted to the noninverting terminal of the operational amplifier OP, i.e., the voltage of the node N, is determined by a superposition principle, as below.

$$Vc = \frac{Rth1}{Rc + Rth1} Vdd + \frac{Rth2}{R1 + Rth2} Vref \quad \text{[Equation 2]}$$

Here, Rth1 is an equivalent resistance value of the resistors R1 and Rc for the voltage Vref of 0 V, and Rth2 is an equivalent resistance value of the resistors Rs and Rc for the voltage Vdd of 0 V.

As described above, the common voltage generator 700 generates the common voltage Vcom based on the temperature-compensation voltage Vc but not the reference voltage Vref, which is received from the DVR 750.

Accordingly, although characteristics of the LCD 11 vary depending on the temperature, the flicker for the LCD 11 can be reduced while taking the variation into account.

Figure 15:
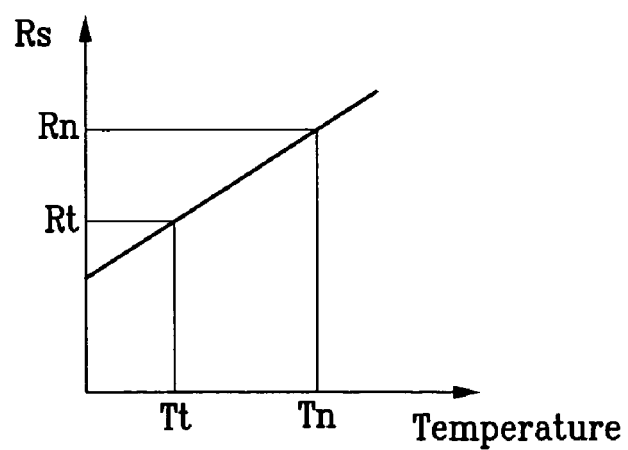
FIG. 15 is a graph showing a resistor characteristic depending on a temperature of a temperature sensor according to another embodiment of the present invention.
Figure 16A:
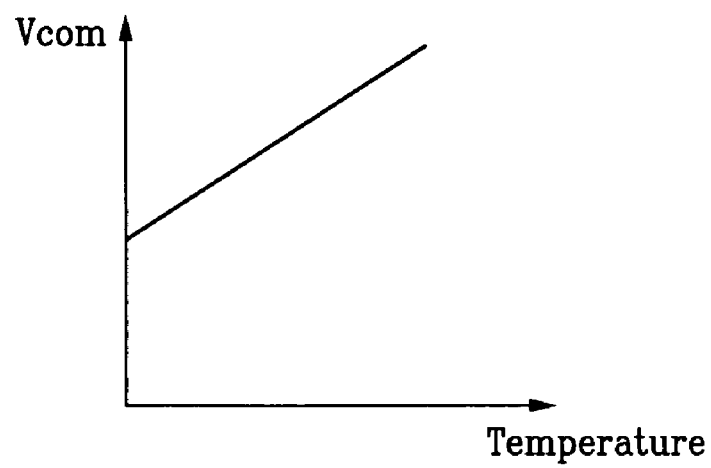
FIGS. 16a and 16b are graphs showing common voltages applying temperature compensation and not applying temperature compensation according to another embodiment of the present invention.
Figure 16B:
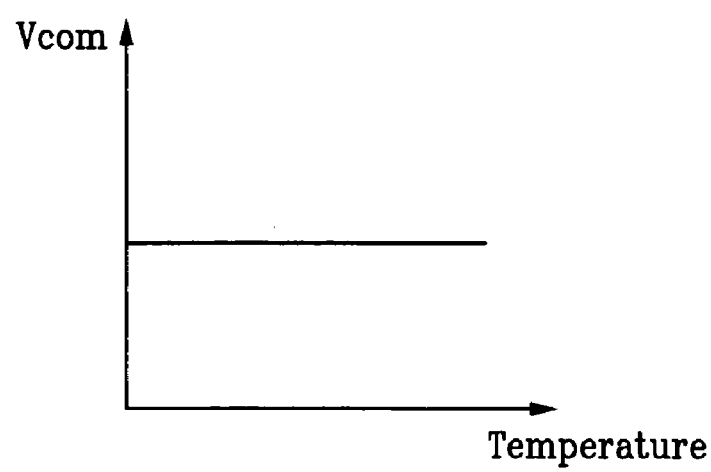

FIG. 15 is a graph showing the resistance characteristic depending on the temperature detected by a temperature sensor according to another embodiment of the present invention, and FIGS. 16a and 16b are graphs showing common voltages with and without temperature compensation, respectively, according to another embodiment of the present invention, respectively.

Referring to FIG. 15, the resistance value of the temperature sensor 51 is linearly proportional to increase in temperature.

Thus, since the temperature sensor 51 has a resistance value Rt for a temperature Tt of the LCD 11 on performing the final test and has a resistance value Rn for a temperature Tn when being used by consumers, the increase in temperature during usage causes the compensation voltage Vc to be increased. As a result, the common voltage Vcom increases as shown in FIG. 16A.

Data voltages generated from the data driver 500 are also increased in proportion to the temperature. Since, in a conventional device, the existing common voltage is constant regardless of the temperature as shown in FIG. 16B, a flicker may appear on the LCD when temperature is increased.

However, according to the present invention, the common voltage Vcom increases with temperature. The common voltage Vcom is positioned at the center of the data voltages to prevent the flicker.

An output signal is directly used without signal processing such as with amplification by a separate amplifier.

Moreover, an undesirable flicker depending on temperature can be controlled accurately by adjusting the common voltage based on signals from using the temperature sensor.

While the present invention has been described in detail with reference to the preferred embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
    a pixel;
    a first signal line connected to the pixel;
    a second signal line connected to the pixel and intersecting the first signal line; and
    a temperature sensing line separate from the first and second signal lines, wherein the temperature sensing line is formed on the same layer as the first or second signal line.

2. The liquid crystal display of claim 1, further comprising a signal controller for controlling the displaying of the pixel based on a signal from the temperature sensing line.

3. The liquid crystal display of claim 2, further comprising:
    a data driver for converting an amended image signal from the signal controller into a data signal to apply the data signal to the first signal line, and
    a gate driver for applying a gate signal for controlling the pixel to the second signal line.

4. The liquid crystal display of claim 3, wherein the signal controller receives an image signal from an external device and amends the image signal based on a previous image signal to output the amended image signal, and wherein the amendment of the image signal is varied in accordance with a signal from the temperature sensing line.

5. A driving circuit for a liquid crystal display having a liquid crystal panel assembly, the driving circuit comprising:
    a digital variable resistor (DVR) generating a first voltage;
    a temperature sensing unit connected to the DVR and generating a second voltage; and
    a common voltage generator connected to the temperature sensing unit and generating a common voltage on the basis of the second voltage and a third voltage that is received from the liquid crystal panel assembly.

6. The driving circuit of claim 5, wherein the temperature sensing unit comprises:
    a first resistor and a second resistor connected between a driving voltage and a ground voltage; and
    a third resistor connected to a node between the first resistor and the second resistor,
    wherein the first resistor is a temperature sensor having a resistance value that varies with temperature.

7. The driving circuit of claim 6, wherein the resistance value of the temperature sensor is proportional to a temperature of the liquid crystal display.

8. The driving circuit of claim 7, wherein the common voltage generator comprises an operational amplifier having an inverting terminal connected to a third voltage and an output terminal via a fourth resistor and a fifth resistor, respectively, and a noninverting terminal connected to the node between the first resistor and the second resistor.

9. A flicker controlling system comprising:
   a liquid crystal display provided with a liquid crystal panel assembly, wherein the liquid crystal display comprises:
      a DVR for generating a first voltage;
      a temperature sensing unit connected to the DVR and generating a second voltage; and
      a common voltage generator connected to the temperature sensing unit and generating a common voltage on the basis of the second voltage and a third voltage that is received from the liquid crystal panel assembly;
   a photographing device for photographing the liquid crystal display; and
   an electronic device coupled with the liquid crystal display and the photographing device.

10. The flicker adjusting system of claim 9, wherein the temperature sensing unit comprises:
   a first resistor and a second resistor connected between a driving voltage and a ground voltage; and
   a third resistor connected between the first voltage and a node between the first resistor and the second resistor,
   wherein the first resistor is a temperature sensor wherein a resistance value thereof is varied depending on temperature.

11. The flicker controlling system of claim 10, wherein the resistance value of the temperature sensor is proportional to a temperature of the liquid crystal display.

12. The flicker controlling system of claim 11, wherein the common voltage generator comprises an operational amplifier having an inverting terminal connected to the third voltage and an output terminal via a fourth resistor and a fifth resistor, respectively, and a noninverting terminal connected to the node.

13. The flicker controlling system of claim 12, wherein the electronic device is coupled with the DVR by an $I^2C$ interface.

* * * * *